US008213694B2

(12) United States Patent
Vaz et al.

(10) Patent No.: US 8,213,694 B2
(45) Date of Patent: Jul. 3, 2012

(54) COMPUTED TOMOGRAPHY RECONSTRUCTION FROM TRUNCATED SCANS

(75) Inventors: Michael Sarju Vaz, Hillsboro, OR (US); Russell Manning Mersereau, Atlanta, GA (US)

(73) Assignee: Barco N.V., Kortrijk (BE)

( * ) Notice: Subject to any disclaimer, the term of this patent is extended or adjusted under 35 U.S.C. 154(b) by 1128 days.

(21) Appl. No.: 12/040,420

(22) Filed: Feb. 29, 2008

(65) Prior Publication Data
US 2009/0220167 A1    Sep. 3, 2009

(51) Int. Cl.
*G06K 9/00* (2006.01)
(52) U.S. Cl. .................................................. 382/128
(58) Field of Classification Search .................. 382/154, 382/231, 260–265, 276, 280
See application file for complete search history.

(56) References Cited

U.S. PATENT DOCUMENTS

| 4,228,505 A | 10/1980 | Wagner |
| 4,305,127 A | 12/1981 | Heuscher |
| 4,550,371 A | 10/1985 | Glover et al. |
| 4,606,004 A | 8/1986 | Crawford et al. |
| 4,674,045 A | 6/1987 | Kerber et al. |
| 5,043,890 A | 8/1991 | King |
| 5,225,980 A | 7/1993 | Hsieh et al. |
| 5,311,428 A | 5/1994 | Hayes et al. |
| 5,485,492 A | 1/1996 | Pelc |
| 5,533,080 A | 7/1996 | Pelc |
| 6,307,909 B1 | 10/2001 | Flohr et al. |
| 6,810,102 B2 | 10/2004 | Hsieh et al. |
| 6,845,141 B2 | 1/2005 | Flohr et al. |
| 7,050,528 B2 | 5/2006 | Chen |
| 7,254,259 B2 | 8/2007 | Hsieh et al. |
| 7,280,630 B2 | 10/2007 | Chen |

OTHER PUBLICATIONS

Kak et al.; "Principles of tomographic imaging"; IEEE Press; New York, NY; 1988 (Previously listed on IDS submitted Feb. 29, 2008).
Ohnesorge et al.; "Efficient correction for CT image artifacts caused by objects extending outside the scan field of view"; Am. Assoc. Phys. Med.; Med. Phys. vol. 27, No. 1; Jan. 2000; pp. 39-46.
Galigekere et al.; "3D Reconstruction from Truncated Rotational Angiograms Using Linear Prediction"; R.E. Ellis and T.M. Peters (Eds.); MICCAI 2003;LNCS 2879; pp. 126-133; 2003.
Cho, et al.; Cone-Beam CT from Width-Truncated Projections; Computerized Medical Imaging and Graphics; vol. 20, No. 1; pp. 49-57; 1996.

(Continued)

*Primary Examiner* — Courtney Thomas
(74) *Attorney, Agent, or Firm* — Renner, Otto, Boiselle & Sklar, LLP (57) ABSTRACT

A system is provided for reconstructing image data having truncated scans. The system includes a padding section for providing non-zero padding to truncated portions of the image data, a pre-weighting section for pre-weighting the image data including both the non-truncated portions and the non-zero padded portions, a filter section for filtering the pre-weighted image data, and a reconstruction section for reconstructing the filtered image data.

54 Claims, 5 Drawing Sheets

OTHER PUBLICATIONS

Hsieh, et al.; A novel reconstruction algorithm to extend the CT scan field-of-view; Am. Assoc. Phys. Med.; vol. 31, No. 9; Sep. 2004; pp. 2385-2391.

Kak et al.; "Principles of tomographic imaging"; IEEE Press; New York, NY; 1988.

Tisson et al.; 3D Region of Interest X-Ray CT for Geometric Magnification From Multiresolution Acquisitions; Vision Lab; Department of Physics; University of Antwerp, Belgium; *IEEE 2004* (Previously submitted in IDS filed on Feb. 29, 2008 with application).

Anoop et al.; Reconstruction from Laterally Truncated Projection Data in Helical Cone-Beam CT; 9th International Meeting on Fully Three-Dimensional Image Reconstruction in Radiology and Nuclear Medicine; pp. 374-377 Jul. 9-13, 2007 (Previously submitted in IDS filed on Feb. 29, 2008 with application).

W. Sweldens; "Building your own Wavelets at home"; Internet: http://cm.bell-labs.com/who/wim/papers/athome/athome.pdf available in 2008 (Previously submitted in IDS filed on Feb. 29, 2008 with application).

COMPUTED TOMOGRAPHY RECONSTRUCTION FROM TRUNCATED SCANS

TECHNICAL FIELD

The present invention relates to computed tomography (CT), and more particularly, to a method and apparatus for reducing artifacts in CT images which result from an object extending beyond the field of view of the detector.

BACKGROUND OF THE INVENTION

In computed tomography (CT), there are many instances where an object that is being scanned exceeds the detector's field of view. Projections acquired as such are referred to as "truncated scans." A known technique for reconstructing volumes from scans such as those obtained using circular trajectory cone beam computed tomography (CBCT) with flat detectors involves the use of the Feldkamp-Davis-Kress (FDK) filtered backprojection (FBP) algorithm. The FDK FBP algorithm usually extends its projections (assumed non-truncated) using zero-padding for the purpose of ramp filtering. This works well for non-truncated projections because the left-right-most values of the scans are in fact zero after the log-scaling stage, and would indeed have been zero even further out, had the detector been larger. However, this is not the case with truncated projections and zero-padding introduces an unrealistic sharp edge that, in turn, introduces strong artifacts to the corresponding reconstructed image. Therefore further consideration is necessary to reconstruct volumes from truncated scans.

Conventional methods for performing CT reconstruction in conjunction with truncated scans view the problem as finding the missing parts of the projection. Such extrapolation-based methods involve specific algorithms, missing data extrapolation via linear prediction, iterative reconstruction, filteration backprojection, etc. However, such methods also force their extrapolated data to tend to zero within some finite number of samples. Such methods place assumptions on the object that was scanned. Moreover, such methods can also violate consistency conditions across projections: often, there does not exist an object such that untruncated scans of this object yield projections resembling the extrapolated data.

Furthermore, some methods do not lend themselves to a real-time streaming implementation, because processing one projection requires knowledge from one or more other projections that may not be available as yet. Some methods are designed for parallel beam scanning, so require rebinning and extra interpolation of the projection data. Other methods require that at least some of the projections should not have been subject be truncation: do not support the "interior problem" where all projections are truncated.

U.S. Pat. No. 4,674,045, entitled "Filter for Data Processing" describes a method to define the ramp filter in the spatial domain and to truncate the impulse response. However, such approach violates a fundamental filter requirement for FBP which is to null out the DC component of the frequency response. Further the corresponding frequency response has large ripple, which is undesirable.

In view of the aforementioned shortcomings associated with conventional approaches, there is a strong need in the art for a method and system for processing truncated projections beyond simply estimating the truncated data. There is a strong need in the art for a method and system in which artifacts may be avoided. There is a strong need for a method and system which lend themselves to real-time streaming implementation and which work efficiently for CT. Still further, there is a strong need in the art for a method and system that do not require data from other projections or prior knowledge of the object being reconstructed. There is a strong need for a method and system that work regardless of whether some or all projections are truncated. In addition, there is a strong need for a method and system that work for both symmetric and asymmetric detector configurations. In a symmetric detector configuration the iso-ray is intended to be coincident with the centroid of the detector, where as in an asymmetric detector configuration, the iso-ray is intended to be co-incident with a location that is offset from the centroid of the detector. For CBCT asymmetry due to a horizontal offset is the primary concern and can be specifically referred to as horizontal asymmetry.

SUMMARY OF THE INVENTION

According to an aspect of the invention, a system and method are provided for reconstructing image data including truncated scans is provided. The system includes a padding section for providing non-zero padding to truncated portions of the image data, and a pre-weighting section for pre-weighting the image data including both the non-truncated portions and the non-zero padded portions. In addition, the system includes a filter section for filtering the pre-weighted image data, and a reconstruction section for reconstructing the filtered image data.

According to another aspect, the padding section utilizes reflective padding.

According to another aspect, the padding section provides reflective padding by symmetric mirroring.

In accordance with another aspect, the filter section includes a two-dimensional filter.

According to yet another aspect, the padding section includes a horizontal padding section for providing non-zero padding in a horizontal direction, and a vertical padding section for providing non-zero padding in a vertical direction.

According to still another aspect, the filter section includes a horizontal filter section for filtering the pre-weighted image data in the horizontal direction, and a vertical filter section for filtering the pre-weighted image data in the vertical direction.

In still another aspect, the pre-weighting section pre-weights the image data following horizontal padding but prior to vertical padding.

According to another aspect, the filter section includes a horizontal ramp filter.

According to another aspect, the horizontal ramp filter exhibits zero DC gain.

In yet another aspect, the padding section provides padding by use of symmetric mirroring.

According to another aspect, the image data includes image intensifier acquired image data representing a projection image with a generally circular foreground.

In accordance with another aspect, the padding section performs non-zero padding of truncated data in a perimeter region defined by a rectangle subscribing the generally circular foreground.

In still another aspect, the padding section further performs non-zero padding of truncated data in a remaining region outside of the rectangle.

According to another aspect, the padding section performs non-zero padding of the perimeter region and remaining region in a horizontal direction and the pre-weighting section pre-weights the resultant horizontally padded image, and the padding section separately performs non-zero padding of the perimeter region and remaining region in a vertical direction and the pre-weighting section pre-weights the resultant vertically padded image.

With still another aspect, the filter section comprises a horizontal filter section for filtering the pre-weighted horizontally padded image, and a vertical filter section for filtering the pre-weighted vertically padded image.

According to another aspect, a system and method are provided for designing a parameterized ramp filter for filtering truncated data. The system includes a construction section for defining a desired frequency domain response of the parameterized ramp filter based on data acquisition parameters and user defined frequency response characteristics. In addition, the system includes a smoothing section for smoothing sharp corners of the defined frequency domain response to improve energy compaction in a corresponding impulse response, a conversion section for converting the smoothened defined frequency domain response to the corresponding impulse response, a truncating section for truncating outer portions of the corresponding impulse response as a function of a predefined impulse response length, a DC correction section for restoring zero DC gain in the truncated impulse response, and an output section defining the parameterized ramp filter based on the DC corrected truncated impulse response.

According to another aspect, the data acquisition parameters include parameters defined by a CT scanner providing raw projection data to be filtered by the parameterized ramp filter.

In still another aspect, the user defined frequency response characteristics include a width of the ramp.

According to yet another aspect, the DC correction section restores zero DC gain by at least one of adding and subtracting components to/from the truncated impulse response in order that the sum of all the response pulses within the truncated impulse response add to zero.

According to still another aspect, the DC correction section maintains symmetry of the truncated impulse response with respect to a central impulse of the truncated impulse response.

In accordance with yet another aspect, the system further includes another conversion section for converting the DC corrected truncated impulse response to a corresponding frequency domain response.

In still another aspect, the system further includes a correction section for nulling out any imaginary values in the corresponding frequency domain response.

According to yet another aspect, a system and method are introduced for providing non-zero padding to image intensifier acquired image data representing a projection image with a generally circular foreground. The system includes a padding section which performs non-zero padding of truncated data in a perimeter region defined within a rectangle subscribing the generally circular foreground.

According to another aspect, the padding section further performs non-zero padding of truncated data in a remaining region outside of the rectangle.

In accordance with another aspect, non-zero padding of the truncated data within the perimeter region is carried out in accordance with a non-zero padding method different than a non-zero padding method used to pad the truncated data in the remaining region outside the rectangle.

According to another aspect, the non-zero padding method used to pad the truncated data in the remaining region outside the rectangle is symmetric mirroring.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the figures, in which like reference labels are used to refer to like elements throughout.

As will be discussed in more detail herein, the method and system in accordance with the present invention designs/modifies the CT reconstruction filter taking into consideration both frequency response and impulse response considerations. Instead of attempting to estimate the truncated data, the present invention performs edge-adaptive filtering. In an exemplary embodiment, a padding scheme accomplishes the desired result without actually having to change the filter. This allows the present invention to perform filtering in the frequency domain.

The invention first designs the frequency response of the CT reconstruction filter for high energy compaction of the corresponding impulse response (IR). The invention then truncates the impulse response and performs a correction that restores a null frequency response at 0 Hz. The resulting filter has very short IR (around 10% of the length of the filters usually used), and exhibits high fidelity to the desired frequency response. As will be appreciated, the short IR filter is desirable because it localizes any artifacts (ex: truncation, metal), allows for shorter fast Fourier transforms (FFT), and reduces the number of samples that need to be extrapolated to obtain a filtered result.

Figure 1:
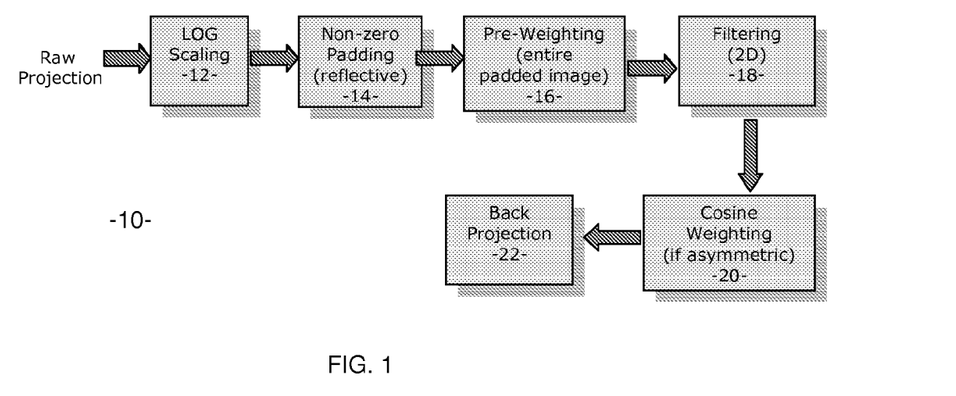
FIG. 1 is a block diagram representing a system for reconstructing truncated scans in accordance with an exemplary embodiment of the present invention.

FIG. 1 is a block diagram representing a system 10 for reconstructing truncated scans in accordance with the present invention. Raw projection data from the x-ray acquisition system/CT scanner (not shown) is input to a log scaling block 12. The raw projection data may be obtained from a conventional CT scanner and may include, as discussed above, truncated scan data. In the exemplary embodiment, the raw projection data is CBCT data that is two-dimensional (e.g., in the horizontal and vertical directions). However, it will be appreciated that the principles of the present invention may be applied to other types of scan data as well including, for example, scan data obtained using other beam geometries such as parallel beam, fan beam, etc.

The log scaling block 12 performs conventional log scaling of the raw projection data. The scaled data from the log scaling block 12 is then input to a non-zero padding block 14. The non-zero padding block 14 is configured to provide non-zero padding in the truncated projection data in preparation for filtering. In the exemplary embodiment, the non-zero padding block 14 inserts reflective padding, also known as symmetric mirroring, in the truncated data. (See, e.g., B. Ohnesorge, et al., *Efficient Correction for CT Image Artifacts Caused by Objects Extending Outside the Scan Field of View*, Med. Phys., 27:39-46, 2000). Padding is provided in both the horizontal and vertical directions of the truncated data.

By applying the non-zero padding, the system 10 avoids introducing an artificial edge in the truncated data and thus avoids undesirable artifacts in the filtered image. The non-zero padding preserves the consistency of the image gradient function over the padded (estimated) region, and enables edge-adaptive filtering with the use of a constant filter kernel. (See, e.g., W. Sweldens et al., *Building Your Own Wavelets at Home*, http://cm.bell-labs.com/who/wim/papers/athome/athome.pdf, p. 75).

The non-zero padded data from the non-zero padding block 14 is input to a pre-weighting block 16. Specifically, the pre-weighting block 16 pre-weights the log-scaled projection data and non-zero padding data (i.e., the entire padded image) prior to being filtered by the system filter block 18. The entire padded image is pre-weighted since non-zero padding has been introduced into the projection data.

The filter block 18 filters the pre-weighted projection data output from the pre-weighting block 16. In the exemplary embodiment, the filter block 18 performs two-dimensional filtering of the data. The filter block 18 includes a horizontal filter, which is a parameterized ramp filter as discussed in more detail below. In addition, the filter block 18 includes a vertical filter that is a low-pass filter having a short impulse response as also discussed in more detail below. Preferably, fast Fourier transforms/inverse fast Fourier transforms (FFTs/IFFTs) are used within the filter block 18 to perform filtering efficiently. In particular, FFTs are known to perform circular convolution. As such, the projection data input to the filter block 18 can be circularly shifted easily. (See, e.g., Openheim & Schafer, *Discrete Time Signal Processing*, $2^{nd}$ Ed., Prentice-Hall (1999)).

The filtered projection data output from the filter block 18 is input to an asymmetric cosine weighting (ACW) block 20. Such asymmetric cosine weighting preferably is provided only in the case where the raw CT projection data constitutes a 360° scan and the CT scanner detector is horizontally asymmetric. The ACW block 20 enables use of an asymmetric detector configuration.

The ACW block 20 is configured to apply a weighting such that the reconstruction contributions from projection at angle $\phi$ and angle ($\phi+180°$) will blend seamlessly. The general idea is that if the weighting matrix is "folded" vertically on its center and summed all summed values would yield the same constant. The term "center" here doesn't refer to the centroid of the detector, but rather where the iso-ray hits the scan detector. (See, e.g., Cho et al., *Cone-Beam CT from Width-Truncated Projections*, Computerized Medical Imaging and Graphics, Vol. 20, No. 1, pp. 46-57 (1996)).

Those having ordinary skill in the art will appreciate that asymmetric weighting functions other than cosine may be utilized without departing from the scope of the invention. In general, it is desirable that the weighting function have the following properties: odd symmetry around the center; monotonic; and $f(a)+f(-a)$=constant, for any a, where a is with respect to the "center". The cosine function is just one function that satisfies these requirements.

Following asymmetric weighting in the ACW block 20, the filtered data is then input to the back projection block 22 in which back projection is carried out on the data in accordance with conventional techniques (e.g., such as those used in known FDK FBP algorithms). If projections are not truncated, block 20 is skipped and the output from block 18 directly becomes the input to block 22.

Figure 2:
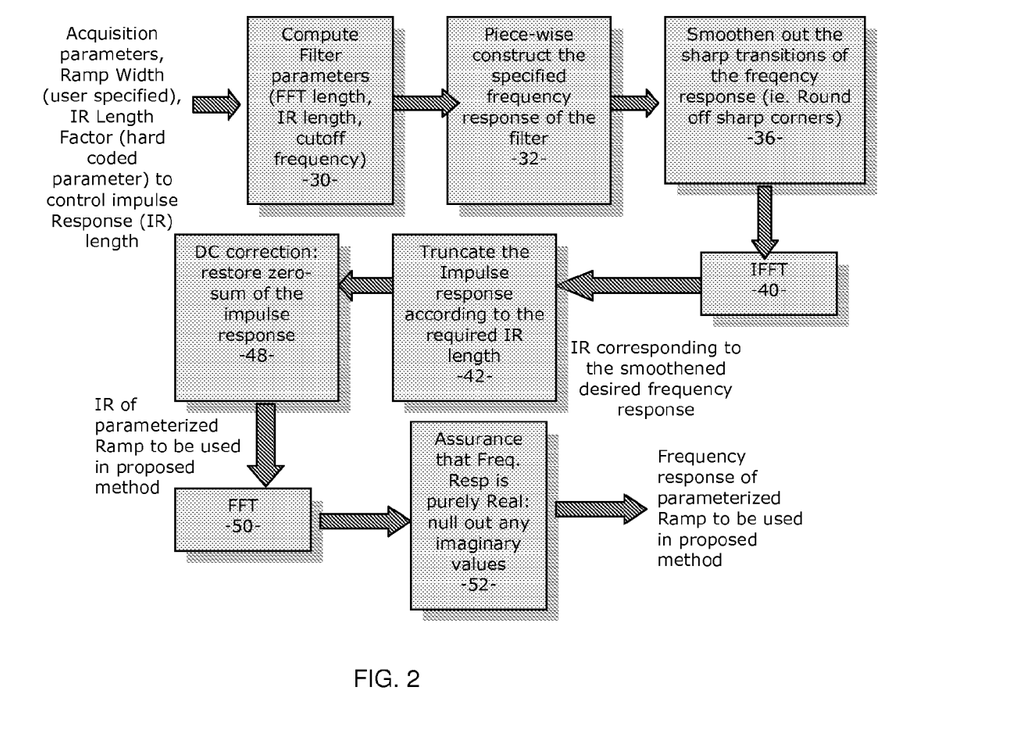
FIG. 2 is a block diagram representing a process for designing a horizontal ramp filter in accordance with an exemplary embodiment of the present invention.
Figure 3:
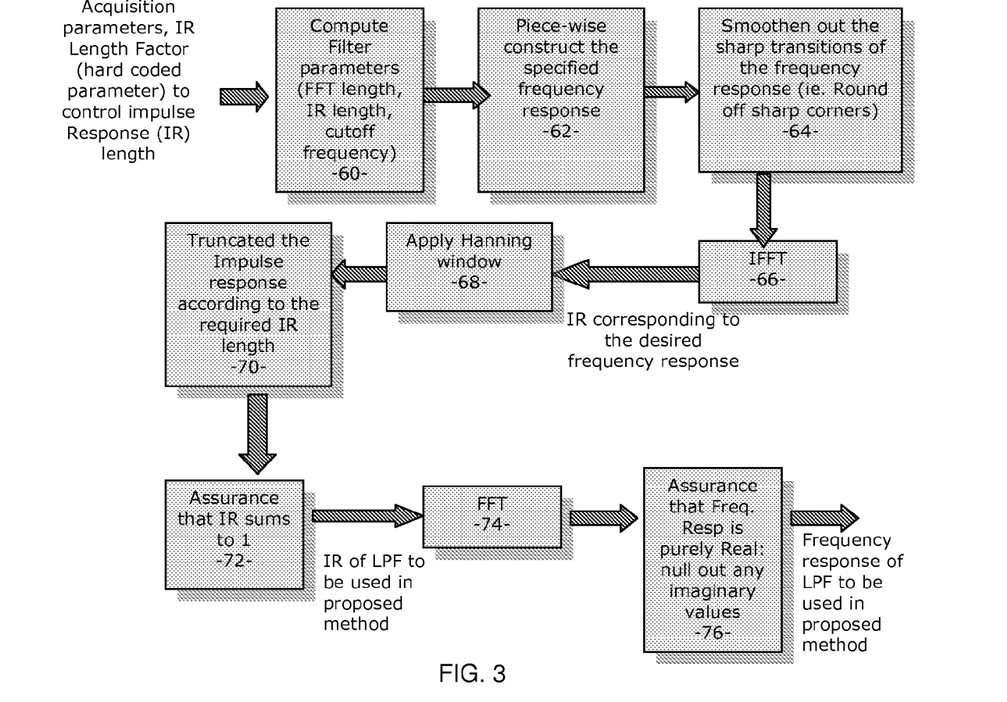
FIG. 3 is a block diagram representing a process for designing a vertical low pass filter in accordance with an exemplary embodiment of the present invention.

Referring now to FIGS. 2 and 3, the design of the filter block 18 will be described in more detail. As previously noted, the filter block 18 is a two-dimensional filter which includes a horizontal filter and a vertical filter for filtering the rows and columns of projection data, respectively. The horizontal filter is a parameterized ramp filter designed in accordance with the steps shown in FIG. 2. The vertical filter is a short impulse response (IR) parameterized low-pass filter (LPF) designed in accordance with the steps shown in FIG. 3.

FIG. 2 represents the process steps for constructing the parameterized ramp filter. The process may be summarized as first constructing a desired frequency domain filter as specified by the user. Next, sharp transitions in the filter are smoothed out to effectively round out any corners. This provides a desirable energy compression (EC) effect on the corresponding impulse response (IR). The corresponding impulse response is truncated in order to conform with the required IR length of the system. However, such truncation will cause the corresponding frequency response to have some non-zero DC (0 Hz) gain, which is undesirable. Accordingly, the truncated impulse response is corrected to restore its sum to zero. This can be done by assuring that the sum of all the pulses in the response is equal to zero. Since the impulse response will only have a few positive and negative values, compensating values can be added or subtracted to ensure that everything sums to zero. The symmetry of the IR with respect to the central impulse is maintained during the zero-sum correction step. The frequency response of the truncated impulse response is then obtained. Since the frequency response should be strictly real (i.e., no imaginary components), any imaginary values that might otherwise exist in the response should be dropped. The resultant frequency response is that which is to be carried out in the parameterized ramp filter serving as the horizontal filter within the filter block 18.

Thus, referring to FIG. 2, the parameters for the ramp filter are defined. These parameters include the data acquisition parameters defined by the CT scanner providing the raw projection data (e.g., number of detector elements across the 2D detector, distance from the x-ray source to the detector, etc.). In addition, the parameters include the ramp width specified by the filter designer. Although theoretically the ramp extends across the pass band, in noisy environments it is desirable to mitigate the ramp at higher frequencies. For example, methods like windowing the ramp with a Hanning or Hamming window can be used to mitigate higher frequencies but such methods can have the effect of over smoothing or under smoothing the filtered the projection. Accordingly, it is desirable to specifically define the filter to give the desirable effects achieved through such windowing but with finer control.

The parameters may further include hard coded parameters. For example, for the parameterized ramp, the impulse response length (IRL) is dependent upon the data sequence length and the cutoff frequency of the filter. Thus, a longer IRL is provided for a lower cutoff frequency. In an exemplary embodiment, the parameters are hard coded such that the IR length is 16% of the sequence length (number of detector columns) for a $\pi/2$ cutoff frequency. The upper 20% of the ramp is tapered (rounded off); the notch (0 Hz) is tapered (rounded) just at the center 3 values; the attenuation factor is 0.00005 (the magnitude allowed in the stop band); the cutoff frequency and cutoff transition width are determined as a function of the ratio of virtual detector pixel width to the reconsruction volume voxel width. FFT length is maintained as an even number for implementation efficiency. The determined impulse response is symmetric about the central impulse.

Figure 4A:
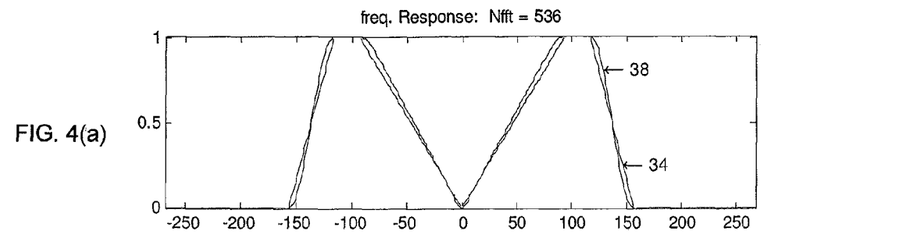
FIGS. 4(a), 4(b) and 4(c) illustrate an exemplary frequency response, impulse response, and impulse response weight distribution in accordance with an embodiment of the present invention.

Based on such defined parameters, the filter parameters are computed in block 30 shown in FIG. 2. Specifically, the parameters such as FFT length, IR length and cutoff frequency for the filter are computed. Next, in block 32 the desired filter is piece-wise constructed insofar as the frequency response as represented, for example, by line 34 in FIG. 4(a). The piece-wise specified filter is then smoothened in block 36 to remove the sharp transitions of the frequency response, as represented by curve 38. Such smoothing provides for improved energy compression (avoiding very long impulse responses due to sharp transitions in the otherwise ideal ramp filter). In block 40, the inverse FFT is performed on the smoothed frequency response of block 36 to produce the impulse response (IR) corresponding to the desired frequency response.

Figure 4B:
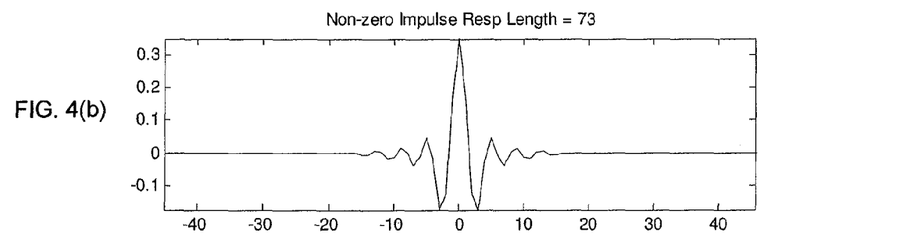
Figure 4C:
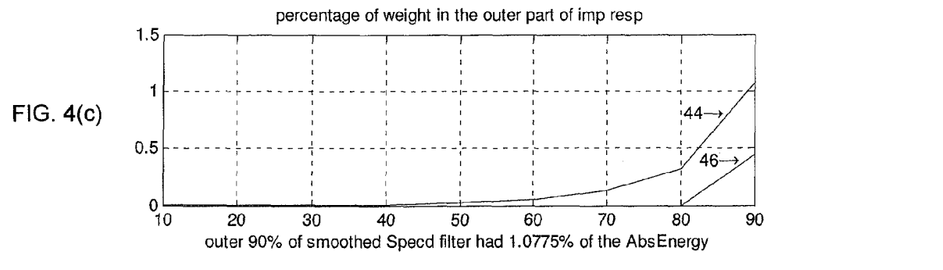

Next, in block 42 the impulse response produced in block 40 is truncated according to the required IR length as defined by the initial parameters entering block 30. FIG. 4(b) exemplifies such a truncated impulse response. Notably, it is only approximately the middle 10% of the impulse response that is non-zero. Curve 44 in FIG. 4(c) illustrates the percentage of weight in the outer portion of impulse response of FIG. 4(b). As shown, the outer 90% of the corresponding impulse response for the smoothed filter has only about 1% of the absolute energy. After IR truncation the outer 80% of the IR is nulled as illustrated by line 46.

The truncated impulse response from block 42 is then provided to block 48 in which the aforementioned correction for non-zero DC (0 Hz) gain is provided. Specifically, components are added to and/or subtracted from the truncated impulse response in order that the sum of all the response pulses within the impulse response add up to zero (thus providing zero DC gain). Since the impulse response will have only a few positive and negative value pulses as exemplified in FIG. 4(b), it is straightforward to add and/or subtract appropriately so that the net sum is zero.

Accordingly, the output of block 48 represents the impulse response of the parameterized ramp filter to be used in accordance with the exemplary embodiment of the present invention. The FFT of the impulse response is obtained in block 50 to produce the corresponding frequency response. In block 52, the frequency response is modified as necessary to null out any imaginary values. The output of block 52 represents the frequency response of the parameterized ramp filter for use as the horizontal filter in accordance with the exemplary embodiment of the present invention.

Referring again to FIG. 3, the process for designing the vertical low-pass filter is shown. Process blocks 60, 62, 64 and 66 for designing the vertical low-pass filter are analogous to blocks 30, 32, 36 and 40, respectively, for designing the horizontal parameterized ramp filter discussed above. Thus, the output of block 66 represents the impulse response corresponding to the desired frequency response of the low-pass filter. In block 68, a Hanning window or similar Gaussian curve is applied to the impulse response. Thereafter, in block 70 the impulse is truncated according to the required impulse response length similar to block 48 in FIG. 2. Since the filter is a low-pass filter, it is desirable that the impulse response add to one. Thus, in block 72 components are added and/or subtracted as necessary so as to add up to unity.

The output of block 72 thus represents the impulse response of the desired vertical low-pass filter in accordance with the exemplary embodiment of the present invention. The FFT of the impulse response is taken in block 74, and in block 76 any imaginary values are nulled out similar to block 52 in FIG. 2. Thus, the output of block 76 represents the frequency response of the desired low-pass filter in accordance with the present invention.

The present invention is thus suitable for CT reconstruction based on truncated scan data using the FDK FBP algorithm. According to the exemplary embodiment, both horizontal and vertical filters are provided. The horizontal filter is a ramp filter in which the ramp width may be manipulated and which provides for anti-aliasing. The vertical filter is used for anti-aliasing.

The filters are designed for high energy compaction in the impulse response. The impulse responses are then truncated and corrected to have minimal impact on the desired frequency response. In the exemplary embodiment involving CBCT scan data, the projections are first extended (padded) and then the entire padded projection is pre-weighted. In the exemplary embodiment, a reflective padding scheme is used in place of an edge-adaptive [boundary adaptive] filter.

Filtering of the truncated scan data according to the present invention works efficiently for CBCT and doesn't require any rebinning. Such filtering lends itself to real-time streaming implementation, and does not require data from other projections. Nor does the filtering design and application of the present invention require prior knowledge of the object being reconstructed. Filtering in accordance with the present invention is operative even in relation to the "interior problem", i.e., it works regardless of whether some or all projections are truncated. The present invention works for both symmetric and asymmetric detector configurations. Artifacts are localized as much as possible via the short IR filter with exquisite frequency domain fidelity. Such filters may have value on their own, even if truncation is not an issue, to suppress metal artifacts, for example.

For truncated scans specifically, the short IR filters localize the influence of the extrapolated data to filtered values proximal to the truncated boundaries. For regular filters, the extrapolated values would influence the entire filtered output. The short IR filters also reduce the amount of extrapolation necessary regardless of the extrapolation method of choice. Extrapolated data is often wrong. So the reduced need for extrapolation reduces the risk of artifacts associated with poor estimation. The present invention consolidates all filter requirements into a single simple filter design: variable ramp width and anti-aliasing. There are no constraints on the object being scanned in that the invention does not explicitly try to extrapolate the truncated data. Such methods involving extrapolation assume certain properties of the object being scanned and result in artifact due to under and/or over estimation. (See, e.g., R.R. Galigekere et al., *3D Reconstruction from Truncated Rotational Angiograms Using Linear Prediction,* presented at MICCAI 2003, LNCS 2879, pp. 126-133, 2003). The present invention uses a simple padding scheme such as a reflective padding scheme, which is equal to performing a certain boundary adaptive filter without any extrapolation. Still further, filtering in accordance with the present invention does not involve esoteric parameters that need to be tweaked for each reconstruction.

The filter design and implementation described herein explicitly designs/modifies the filter with both frequency response and impulse response considerations and has acute practical benefits, while maintaining theoretical soundness. As previously noted, the invention does not need to estimate the truncated data, but rather seeks to perform edge-adaptive filtering. A padding scheme is chosen that accomplishes this result without actually changing the filter. This enables the invention to perform filtering in the frequency domain. In general, adaptive filters don't lend themselves to a frequency domain implementation.

A filter with a short impulse response (IR) is desirable, but until now has not been used, due to undesirable effects caused by just truncating the impulse response of the ramp filter (non-zero frequency response at 0 Hz and excessive ripple). The frequency response of the filter is designed for high energy compaction of the corresponding IR. The IR is then truncated and corrected to restore a null frequency response at 0 Hz. The resulting filters have very short IRs (around 10% of the length of filters usually used) and high fidelity to the desired frequency response. The short IR filters are desirable because they allow for shorter FFTs, localize any artifacts (ex: truncation, metal), reduce the number of samples that need to be extrapolated to obtain a filtered result. The invention facilitates real-time implementations and accurate anti-aliasing.

The approach of defining anti-aliasing filters to be applied to the projection data as a function of detector resolution and reconstruction volume resolution when bilinear interpolation is used to sample the projection data has heretofore not been developed. Aliasing discussed in the literature cites insufficient projections and low detector resolution as the causes for aliasing. (See, e.g., A.C. Kak, et al., *Principles of Tomographic Imaging*, (IEEE Press, New York, 1988). The present invention addresses the situation where the virtual detector resolution exceeds that of the reconstruction volume.

Thus, the present invention provides horizontal and vertical filtering of the raw projection data. As described above, the filtering may be performed as a single 2D filtering operation. The 2D filtering may be performed directly, e.g., using 2D FFT operations. On the other hand, in an alternative embodiment the 2D filtering may be performed separably, e.g., by concatenating horizontal 1D filtering performed on each row and vertical filtering performed on each column. Identical results may be obtained using either method.

Figure 5:
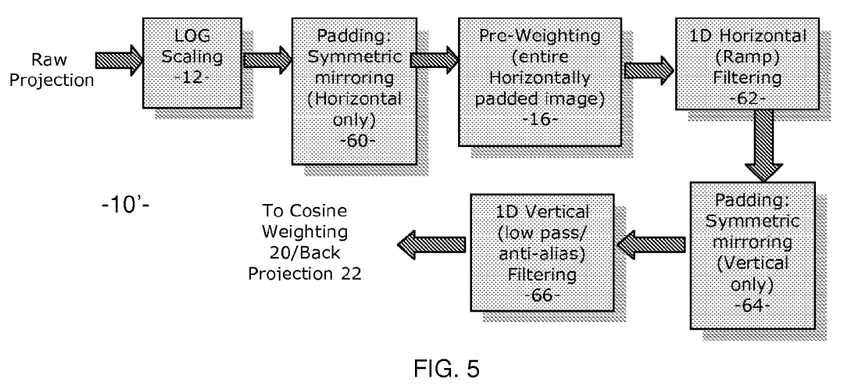
FIG. 5 is a block diagram representing in relevant part a system for reconstructing truncated scans in accordance with another embodiment (separable implementation of filters) of the present invention.

FIG. 5 illustrates in relevant part an alternative embodiment 10' using horizontal and vertical 1D filtering. As in the case of the embodiment of FIG. 1, the raw projection data is input to and scaled by the log scaling block 12. Unlike the embodiment of FIG. 1, however, the scaled data is then input to a horizontal non-zero padding block 60 included as part of the non-zero padding block 14. In the horizontal non-zero padding block 60, the truncated projection data is padded in the horizontal direction only in preparation for filtering, again using symmetric mirroring for example. Thereafter, the entire image (i.e., the horizontally padded image) is pre-weighted as part of the by pre-weighting block 16 in the embodiment of FIG. 1.

The pre-weighted data is then filtered by a one-dimensional horizontal ramp filter 62. As will be appreciated, the one-dimensional horizontal ramp filter may be designed in accordance with the techniques described above in relation to FIG. 2. The horizontally filtered image data then undergoes non-zero padding (e.g., using symmetric mirroring) in the vertical direction only via a vertical non-zero padding block 64 included as part of the non-zero padding block 14. Following vertical padding, the image data is filtered by a one-dimensional vertical low-pass filter 66. Such a vertical low-pass filter 66 may be designed in accordance with the techniques described above in relation to FIG. 3, for example. Following vertical filtering, the data proceeds to the cosine weighting block 20 and back projection block 22 as in the embodiment of FIG. 1.

Implementation of one-dimensional filtering in accordance with the embodiment of FIG. 5 is believed to execute significantly faster than the two-dimensional embodiment of FIG. 1. Because the padding and filtering is performed row-by-row and then column by column, less complex filtering may be utilized and ultimately less data is processed than in block 18 of FIG. 1.

Additionally, the embodiment of FIG. 5 is particularly suited for dealing with truncation of the raw projection data to image intensifiers (II). As is known, projection data may be truncated due to detectors that use image intensifiers and yield projection images with a circular foreground. With limited exceptions, CT scans acquired using II detectors are typically truncated.

According to a preferred embodiment, the present invention handles II acquired data by applying what is referred to herein as "perimeter padding" (PP) prior to symmetric mirroring. PP involves padding the II acquired image such that the padded region lies within a rectangle that subscribes the circular foreground, but falls outside the circular foreground. PP is filter direction dependent and is applied on two occasions: once prior to horizontal symmetric mirroring (block 60) and once prior to vertical symmetric mirroring (block 64).

Figure 6:
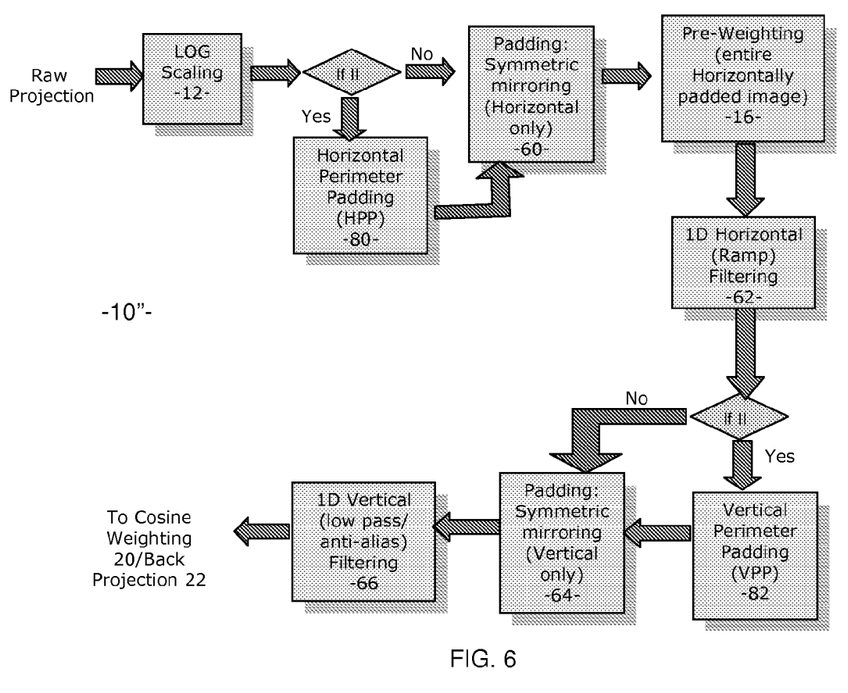
FIG. 6 is a block diagram illustrating an extension to the embodiment presented in FIG. 5, such that projections acquired using image intensifiers (II) may be accommodated.

FIG. 6 illustrates such an embodiment 10" for handing 2D rectangular foreground data in the manner described above in relation to the embodiment of FIG. 5, as well as II acquired image data with a generally circular foreground. The system 10" differs from the embodiment in FIG. 5 only in the following manner. Once the raw projection data is output from the log scaling block 12, the system determines whether the projection data is conventional 2D rectangular foreground data as discussed above in the previous embodiments, or II acquired image data. Such detection may be automated in that the system 10" is configured to analyze the projection data to ascertain whether the data has a 2D rectangular foreground or a generally circular foreground. Alternatively, in a CT system in which the data is always II acquired image data, the system 10" may be configured simply to treat all raw projection data as II acquired image data.

If the projection data is II acquired image data, the log-scaled data from the log scaling block 12 is input to a horizontal perimeter padding block 80 in which horizontal perimeter padding (HPP) is carried out prior to the afore-described non-zero horizontal only padding as part of block 60 in order to complete the horizontal padding. HPP is discussed in more detail below in relation to FIGS. 7A and 7B.

Following the one-dimensional horizontal ramp filtering of the data in block 62, if the projection data is II acquired image data, as previously ascertained, vertical perimeter padding (VPP) is carried out in block 82. Such VPP is described in more detail below in relation to FIGS. 7C and 7D. Thereafter, non-zero vertical only padding is completed as part of the non-zero vertical padding block 64 as in the embodiment of FIG. 5.

Figure 7A:
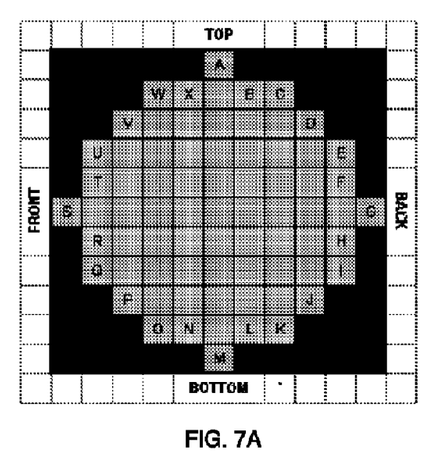
FIGS. 7(a), 7(b), 7(c) and 7(d) illustrate the circular foreground of a projection captured using an image intensifier (II) detector, horizontal perimeter padding (HPP) that is applied to complete the bounding rectangle, circular foreground of the horizontally filtered II projection and the vertical perimeter padding (VPP) that is applied to complete the bounding box.

FIG. 7A represents exemplary II acquired image data. The light shaded blocks represent the generally circular foreground of the II image, with the characters (e.g., C, D, E, etc.) representing values of the image data along the perimeter. The dark shaded blocks represent a region outside the generally circular foreground, that is inside the subscribing rectangle. As is exemplified in FIG. 7B, HPP is used to non-zero pad the region outside the generally circular foreground and inside the subscribing rectangle. Thereafter, the above described padding as part of the non-zero horizontal padding block 60 is carried out to complete the remainder of the otherwise rectangular 2D image for processing in accordance with the embodiment of FIG. 5.

As an example of HPP carried out in block 80, one considers the North-East (i.e., upper right) quadrant of FIG. 7A. The "perimeter vector" for this NE quadrant is simply the vector of values on the boundary of the foreground as one goes from 12 o'clock to 3 o'clock. {A, B, C, D, E, F, G}. HPP simply emulates the effect of traversing a row inside the projection foreground and at the end of the row "turning" in the direction that forms an obtuse angle with at row and following the boundary of the foreground. For the second row this would mean that one would start at W and traverse left to X, . . . , B, C→now one reaches the end of the row, so turn downwards→D, E, . . . .

Figure 7B:
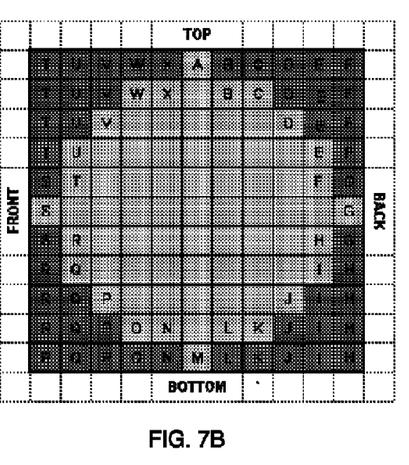
Figure 7C:
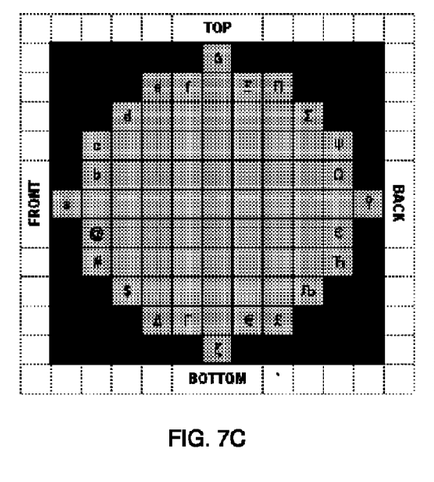

For efficient implementation: one identifies that for the second row of the NE quadrant one requires as length-3 portion of the perimeter vector beginning at "D". The light shaded blocks in FIG. 7B illustrate the results of HPP on the II acquired image data.

Figure 7D:
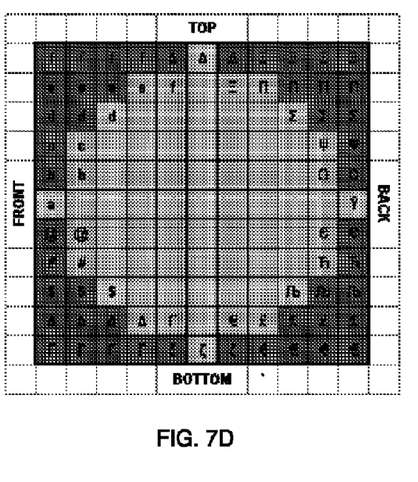

As an example of VPP carried out in block 82 the same principles apply, except one is now traversing the columns. For example, FIG. 7C again represents the acquired image data (analogous to FIG. 7A). FIG. 7D represents the results of the VPP operation. In another embodiment, VPP also can be accomplished by transposing the image in the sense of applying HPP and then transposing the output.

Perimeter padding in association with II acquired image data according to the present invention is advantageous over other techniques for several reasons. For example, consider horizontal ramp filtering (without loss of generality with respect to other types of filtering). The filter design is a function of the length of the sequence that needs to be filtered. For II acquired data, the length of each row of the image data increases as one moves from the top towards the center and then decreases as one moves to the bottom. This necessitates special consideration: one option would be to design separate filters for each unique row length and filter each row independently using symmetric mirroring. However, towards to upper and lower extrema, as row lengths approach small values (upper/lower most row lengths are 1 and 5 in the example illustrated in FIGS. 7A-7D), designing a filter that has the desired frequency domain characteristics and has appropriate impulse response length (IR length) is difficult.

The use of PP makes it possible to design the filter once and use that filter for the entire projection. This avoids the practical issue of filtering excessively short rows. Additionally, using PP essentially fills out the II projection and lets it masquerade as a FP projection. Consequently, the image can be processed elegantly using the separable framework in the embodiment of FIG. 5.

The present invention thus makes it possible to produce a reconstruction volume with superior detail covering the full extent of the maximum theoretical field of view for both flat panel (FP) and image intensifier (II) detectors.

In accordance with the present invention, the design process and filtering functions described herein are carried out via a computer programmed to perform the described process and functions. For example, such a computer is programmed to carry out the respective filter design steps based on the various acquisition parameters, etc., input in blocks 30 and 60 as represented in FIGS. 2 and 3. Similarly, a computer may be programmed to carry out the filtering and padding functions on the raw projection data as represented in FIGS. 1, 5 and 6. Those having ordinary skill in the art of computer programming will readily understand how to program a computer to perform the procedures and functions described herein without undue effort or experimentation. Accordingly, details regarding the specific program code have been omitted for sake of brevity.

The present invention incorporates a computer programmed to carry out the processes and functions described herein. In addition, the present invention incorporates a computer program stored on a computer-readable medium which, when executed by a computer, causes the computer to carry out the processes and functions described herein.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A computer-implemented apparatus for reconstructing image data including truncated scans, comprising:
   a padding section for providing non-zero padding to truncated portions of the image data;
   a pre-weighting section for pre-weighting the image data including both the non-truncated portions and the non-zero padded portions;
   a filter section for filtering the pre-weighted image data; and
   a reconstruction section for reconstructing the filtered image data.

2. The apparatus of claim 1, wherein the padding section utilizes reflective padding.

3. The apparatus of claim 1, wherein the padding section provides reflective padding by symmetric mirroring.

4. The apparatus of claim 1, wherein the filter section comprises a two-dimensional filter.

5. The apparatus of claim 1, wherein the padding section comprises a horizontal padding section for providing non-zero padding in a horizontal direction, and a vertical padding section for providing non-zero padding in a vertical direction.

6. The apparatus of claim 5, wherein the filter section comprises a horizontal filter section for filtering the pre-weighted image data in the horizontal direction, and a vertical filter section for filtering the pre-weighted image data in the vertical direction.

7. The apparatus of claim 6, wherein the pre-weighting section pre-weights the image data following horizontal padding but prior to vertical padding.

8. The apparatus of claim 1, wherein the filter section comprises a horizontal ramp filter.

9. The apparatus of claim 8, wherein the horizontal ramp filter exhibits zero DC gain.

10. The apparatus of claim 9, wherein the padding section provides padding by use of symmetric mirroring.

11. The apparatus of claim 1, wherein the image data comprises image intensifier acquired image data representing a projection image with a generally circular foreground.

12. The apparatus of claim 11, wherein the padding section performs non-zero padding of truncated data in a perimeter region defined by a rectangle subscribing the generally circular foreground.

13. The apparatus of claim 12, wherein the padding section further performs non-zero padding of truncated data in a remaining region outside of the rectangle.

14. The apparatus of claim 13, wherein the padding section performs non-zero padding of the perimeter region and remaining region in a horizontal direction and the pre-weighting section pre-weights the resultant horizontally padded image, and wherein the padding section separately performs non-zero padding of the perimeter region and remaining region in a vertical direction and the pre-weighting section pre-weights the resultant vertically padded image.

15. The apparatus of claim 14, wherein the filter section comprises a horizontal filter section for filtering the pre-weighted horizontally padded image, and a vertical filter section for filtering the pre-weighted vertically padded image.

16. A computer-implemented apparatus for designing a parameterized ramp filter for filtering truncated data, comprising:
a construction section for defining a desired frequency domain response of the parameterized ramp filter based on data acquisition parameters and user defined frequency response characteristics;
a smoothing section for smoothing sharp corners of the defined frequency domain response to improve energy compaction in a corresponding impulse response;
a conversion section for converting the smoothened defined frequency domain response to the corresponding impulse response;
a truncating section for truncating outer portions of the corresponding impulse response as a function of a predefined impulse response length;
a DC correction section for restoring zero DC gain in the truncated impulse response; and
an output section defining the parameterized ramp filter based on the DC corrected truncated impulse response.

17. The apparatus of claim 16, wherein the data acquisition parameters comprise parameters defined by a CT scanner providing raw projection data to be filtered by the parameterized ramp filter.

18. The apparatus of claim 16, wherein the user defined frequency response characteristics include a width of the ramp.

19. The apparatus of claim 16, wherein the DC correction section restores zero DC gain by at least one of adding and subtracting components to/from the truncated impulse response in order that the sum of all the response pulses within the truncated impulse response add to zero.

20. The apparatus of claim 19, wherein the DC correction section maintains symmetry of the truncated impulse response with respect to a central impulse of the truncated impulse response.

21. The apparatus of claim 16, further comprising another conversion section for converting the DC corrected truncated impulse response to a corresponding frequency domain response.

22. The apparatus of claim 21, further comprising a correction section for nulling out any imaginary values in the corresponding frequency domain response.

23. A apparatus for providing non-zero padding to image intensifier acquired image data representing a projection image with a generally circular foreground, comprising:
a padding section which performs non-zero padding of truncated data in a perimeter region defined within a rectangle subscribing the generally circular foreground.

24. The apparatus of claim 23, wherein the padding section further performs non-zero padding of truncated data in a remaining region outside of the rectangle.

25. The apparatus of claim 24, wherein non-zero padding of the truncated data within the perimeter region is carried out in accordance with a non-zero padding method different than a non-zero padding method used to pad the truncated data in the remaining region outside the rectangle.

26. The apparatus of claim 25, wherein the non-zero padding method used to pad the truncated data in the remaining region outside the rectangle is symmetric mirroring.

27. A method for reconstructing image data including truncated scans, comprising:
providing non-zero padding to truncated portions of the image data;
pre-weighting the image data including both the non-truncated portions and the non-zero padded portions;
filtering the pre-weighted image data; and
reconstructing the filtered image data.

28. The method of claim 27, wherein the non-zero padding utilizes reflective padding.

29. The method of claim 27, wherein the reflective padding is performed by symmetric mirroring.

30. The method of claim 27, wherein the filtering is performed in two dimensions.

31. The method of claim 27, wherein non-zero padding is provided in a horizontal direction, and non-zero padding is provided in a vertical direction.

32. The method of claim 31, wherein the pre-weighted image data is filtered in the horizontal direction and in the vertical direction.

33. The method of claim 32, wherein the image data is pre-weighted following horizontal padding but prior to vertical padding.

34. The method of claim 27, wherein the filtering is performed using a horizontal ramp filter.

35. The method of claim 34, wherein the horizontal ramp filter exhibits zero DC gain.

36. The method of claim 35, wherein the padding is provided by use of symmetric mirroring.

37. The method of claim 27, wherein the image data comprises image intensifier acquired image data representing a projection image with a generally circular foreground.

38. The method of claim 37, comprising performing non-zero padding of truncated data in a perimeter region defined by a rectangle subscribing the generally circular foreground.

39. The method of claim 38, further comprising performing non-zero padding of truncated data in a remaining region outside of the rectangle.

40. The method of claim 39, wherein the non-zero padding of the perimeter region and remaining region in a horizontal direction and the pre-weighting of the resultant horizontally padded image is performed separately from the non-zero padding of the perimeter region and remaining region in a vertical direction and the pre-weighting of the resultant vertically padded image.

41. The method of claim 40, wherein the pre-weighted horizontally padded image is filtered by a horizontal filter, and the pre-weighted vertically padded image is filtered by a vertical filter.

42. A non-transitory computer-readable medium having a program stored thereon which, when executed by a computer, causes the computer to carry out the steps recited in claim 27.

43. A method for designing a parameterized ramp filter for filtering truncated data, comprising:
   defining a desired frequency domain response of the parameterized ramp filter based on data acquisition parameters and user defined frequency response characteristics;
   smoothing sharp corners of the defined frequency domain response to improve energy compaction in a corresponding impulse response;
   converting the smoothened defined frequency domain response to the corresponding impulse response;
   truncating outer portions of the corresponding impulse response as a function of a predefined impulse response length;
   DC correcting the truncated impulse response by restoring zero DC gain in the truncated impulse response; and
   defining the parameterized ramp filter based on the DC corrected truncated impulse response.

44. The method of claim 43, wherein the data acquisition parameters comprise parameters defined by a CT scanner providing raw projection data to be filtered by the parameterized ramp filter.

45. The method of claim 43, wherein the user defined frequency response characteristics include a width of the ramp.

46. The method of claim 43, wherein the zero DC gain is restored by at least one of adding and subtracting components to/from the truncated impulse response in order that the sum of all the response pulses within the truncated impulse response add to zero.

47. The method of claim 46, wherein symmetry of the truncated impulse response with respect to a central impulse of the truncated impulse response is maintained.

48. The method of claim 43, further comprising converting the DC corrected truncated impulse response to a corresponding frequency domain response.

49. The method of claim 48, further comprising nulling out any imaginary values in the corresponding frequency domain response.

50. A method for providing non-zero padding to image intensifier acquired image data representing a projection image with a generally circular foreground, comprising:
   performing non-zero padding of truncated data in a perimeter region defined within a rectangle subscribing the generally circular foreground.

51. The method of claim 50, further comprising performing non-zero padding of truncated data in a remaining region outside of the rectangle.

52. The method of claim 51, wherein non-zero padding of the truncated data within the perimeter region is carried out in accordance with a non-zero padding method different than a non-zero padding method used to pad the truncated data in the remaining region outside the rectangle.

53. The method of claim 52, wherein the non-zero padding method used to pad the truncated data in the remaining region outside the rectangle is symmetric mirroring.

54. A non-transitory computer-readable medium having a program stored thereon which, when executed by a computer, causes the computer to carry out the steps recited in claim 43.

* * * * *